Dec. 3, 1946.  F. D. BRADDON  2,411,866
MAGNETIC DEFLECTION CORRECTED COMPASS
Filed Dec. 7, 1942  2 Sheets-Sheet 1
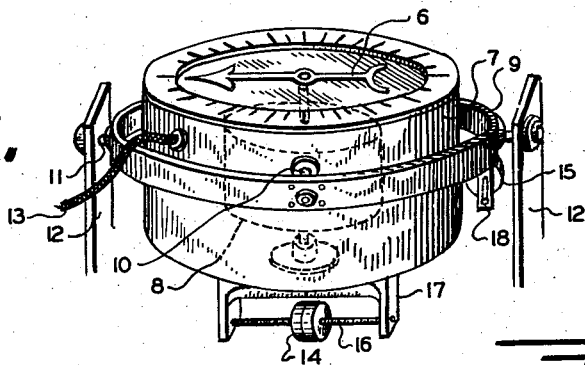
Fig.1.
Fig.2.
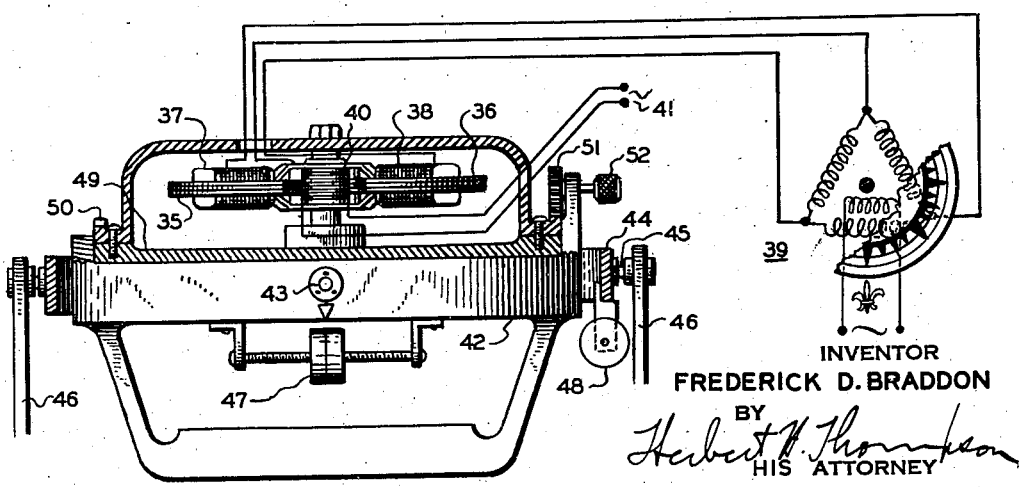
Fig.3.
INVENTOR
FREDERICK D. BRADDON
BY
Herbert H. Thompson
HIS ATTORNEY Dec. 3, 1946.   F. D. BRADDON   2,411,866
MAGNETIC DEFLECTION CORRECTED COMPASS
Filed Dec. 7, 1942   2 Sheets-Sheet 2
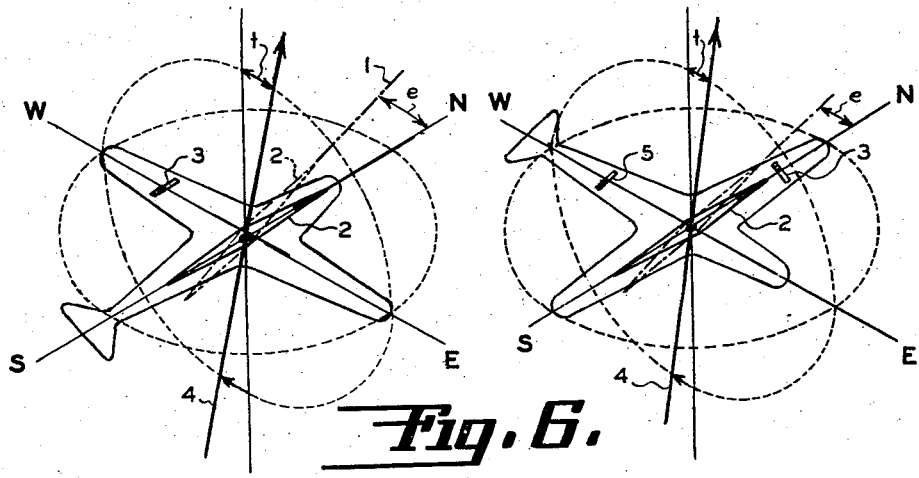
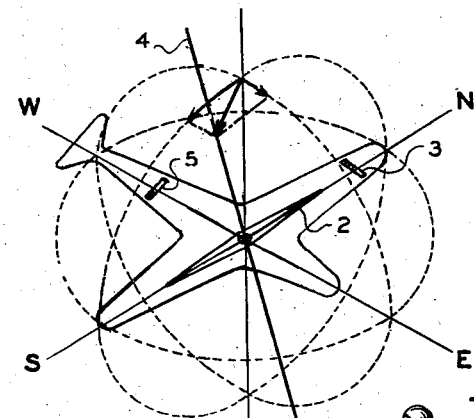
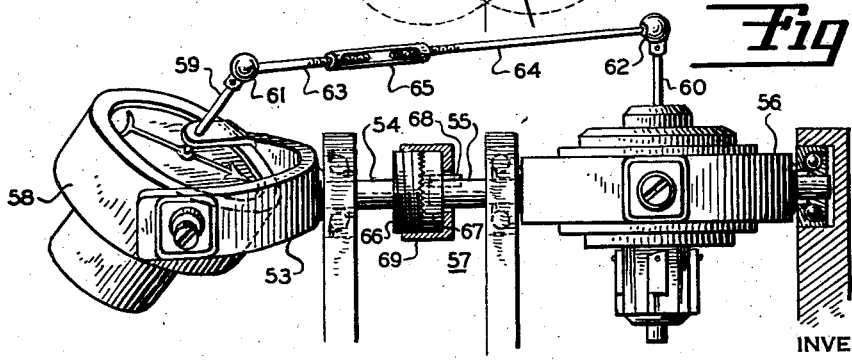
INVENTOR
FREDERICK D. BRADDON Patented Dec. 3, 1946

2,411,866

UNITED STATES PATENT OFFICE 2,411,866

MAGNETIC DEFLECTION CORRECTED COMPASS

Frederick D. Braddon, Babylon, N. Y., assignor to Sperry Gyroscope Company, Inc., Brooklyn, N. Y., a corporation of New York Application December 7, 1942, Serial No. 468,316

12 Claims. (Cl. 33—225)

My invention more particularly relates to a compass, as this term is used in its broad sense, and to means for correcting for deflection of the sensitive element thereof which is affected by the earth's magnetic field, where deflection is due to some local attraction resulting from structural or other effects of the craft on which the compass is mounted. This deflection, of course, produces error in the bearing indications to some degree depending upon the course or heading of the craft.

In practice, it has been customary to maintain the sensitive element of a compass such as that of a flux gate or flux valve in a horizontal plane or, if it comprises a pivotal axis, as a compass needle, with its pivotal axis in vertical position in order to subject the sensitive element to the horizontal component only of the earth's magnetic field and thereby obtain true indications of course or heading in azimuth relative to magnetic north, excepting deflection errors due to magnetic disturbances or from other causes.

However, I have determined that the dip or vertical component of the earth's magnetic field may be utilized to correct for error which would otherwise occur in the heading indication of a compass because of local magnetic attraction on the craft on which it is mounted. Briefly, this is accomplished by subjecting the sensitive element of the compass not only to the horizontal component of the earth's field but also to the vertical component thereof and in such manner and to such a degree as to compensate for or correct the error otherwise present due to the local disturbances above referred to.

It is, therefore, the object of my invention to provide a compass and means for positioning the sensitive element thereof in a position in which it is subjected to an effective vertical component of the earth's field of a magnitude which will correct in extent and direction a deviation error due to a known local magnetic disturbance or attraction.

A further object resides in providing a compass of the foregoing character comprising adjustable positioning means whereby the position of the sensitive element may be adjusted to one in which it is subjected to the proper error-correcting, effective vertical component of the earth's field when mounted on crafts which may have different but known error-producing characteristics.

Another object resides in providing a compass generally of the foregoing character in which the adjustable positioning means comprises a mass or masses movable eccentrically of the vertical axis through the center of gravity of the unit comprising the sensitive element of the compass and its pendulous supporting frame element whereby the degree of eccentricity of said mass or the resultant eccentricity of said masses may be varied to provide the desired error-correcting effect as derived from the vertical component of the earth's field.

With the foregoing and other objects in view, my invention includes the novel constructions and correlation of elements described below and illustrated in the accompanying drawings, in which Fig. 1 is a perspective view of a pendulously mounted compass, illustrating one embodiment of my invention;

Fig. 2 is a wiring diagram of elements and connections for a remote reading or repeating compass;

Fig. 3 represents, partially broken away and in section, a flux valve embodying one form of my invention;

Figs. 4, 5 and 6 are diagrammatic views representing assumed compass errors and how they are corrected according to the theory of this invention; and Fig. 7 is an elevation view of a compass coupled to a gyro vertical in an error-correcting manner, the tilt of the compass being exaggerated for illustration purposes.

Ordinarily, as hereinbefore explained, compasses such as those employing a magnetic bar or needle or those of the flux valve or flux gate type are maintained in a position in which the sensitive element is not subjected to a vertical component of the earth's magnetic field. In other words, the pivotal axis of the needle is maintained vertical while the axis of the core and windings of the flux valve or flux gate are maintained in a horizontal plane. Under such conditions, the compass readings are free from error so far as the effective components of the earth's magnetic field are concerned to provide directions of course or heading in azimuth. However, when such a compass is so mounted on a craft, the heading indications afforded thereby may be in error because of local attraction from the structure of the particular craft. Therefore, such local magnetic disturbances are constant but the magnitude and the direction of the error produced thereby may vary for different courses or headings of the craft.

For example, let us assume that due to some source of local magnetic disturbances on a craft the compass error is 9° westerly on a north heading of the craft; 6° westerly on an east heading; 9° easterly on a south heading; and 6° easterly on a west heading. Further, let us assume that the angle of dip of the earth's field for the location of the craft's course is 72°.

Also, for the purpose of illustrating the theory of this invention, we will assume that the compass is pendulously carried in a universal mounting having mutually perpendicular axes, one of which extends parallel to the fore and aft axis of the craft and the other extending athwartship. It is therefore possible to tilt the compass about either or both of these axes. In the event the compass is of the rotatable needle type such tilting will incline the pivotal axis of the needle relative to the vertical and in the flux gate or flux valve type will tip the sensitive element thereof out of a horizontal plane.

In order to correct for the assumed errors above indicated, first consider the craft as having a north heading. In this case, the sensitive element of the compass may be tipped from a position in which it is subjected to a horizontal component only of the earth's field about the fore and aft axis of its mounting to subject it to some effective vertical component of the earth's field, the magnitude of which will depend on the degree to which it is tipped from said position about said axis and the direction in azimuth of the effect of such vertical component on the indications of said compass will depend on whether the sensitive element is so tipped in a clockwise or counter-clockwise direction.

In connection with the above assumptions, consider the compass as a direct reading, needle type compass of which Fig. 1 is illustrative. The craft, on a north heading but following a 9° westerly error in compass indication will travel in a direction represented by the dot-dash line 1 in Fig. 4. Line 1 coincides with the longitudinal axis of needle 2 in its dotted position, deflection of which from a true magnetic north bearing is due to some local magnetic disturbance represented in the drawings as a magnetic body 3 in a wing of the craft. To correct for such error and to restore the needle to a correct magnetic north bearing as shown in full lines in Fig. 4, the pivotal axis of the needle represented by the heavy line 4 is tipped from the vertical and in a clockwise direction about the fore and aft axis while said axis lies on the true magnetic north bearing as shown in Fig. 4. Shifting of the needle and its pivotal axis in this manner will subject the needle to an effective vertical component of the earth's field, the magnitude of which will depend on the degree to which its axis is tilted. To determine the degree to which said axis should be tilted in order that the effect of the vertical component of the earth's field will be of proper magnitude accurately to correct for any given error, the following formula is employed.

$$\tan e = \tan d \times \sin t$$

where $e$ = angle of deviation of the needle or angle of error;
$d$ = angle of dip of the earth's magnetic field;
$t$ = angle of tilt or the angle between the pivotal axis of the needle and the vertical;

or:

$$\sin t = \frac{\tan e}{\tan d}$$

Substituting the known values for $e$ and $d$, the value of $t$ may be determined. For the values herein assumed, $t$ will be found to be approximately 3°.

Therefore, the axis 4 should be tipped 3° out of vertical about the north bearing, fore and aft axis and in a clockwise direction to give the angle of correction a positive (+) sign or to provide a correction in a clockwise direction. By tilting the axis 4 in the above manner, it will provide corrective movements in azimuth of the needle as follows: +9° on a north heading of the craft; 0° on an east heading; —9° on a south heading; and 0° on a west heading.

To correct for errors in east and west headings, consider the craft on an east heading as shown in Fig. 5 and assume a magnetic body 5 in the tail of the craft as the source or added source of disturbance producing the assumed 6° westerly error on an east heading and 6° easterly error on a west heading. By applying the foregoing formula, $t$ or the angle of tilt will prove to be approximately 2°. Since for either of these headings, the athwartship axis of the compass mounting will lie on the magnetic north bearing, the compass may be tipped about this axis, as shown in Fig. 5, and, for the assumed east heading of the craft, in a clockwise direction about said athwartship's axis. By tilting the axis 4 of the needle in the foregoing manner and degree, it will provide corrective movements in azimuth of the needle as follows: 0° on a north heading of the craft; +6° on an east heading (+ being a clockwise azimuth movement of the needle); 0° on a south heading; and —6° on a west heading.

Hence, if the pivotal axis 4 of the needle is tilted about both the fore and aft and the athwartship axes of its mounting, it will assume the position shown in Fig. 6 wherein the above described correcting actions will combine to compensate for the assumed local attraction. In other words, for this position of the axis 4, a resultant of the 3° and 2° tilting in quadrature, the needle will be subjected to vertical components of the earth's field which will provide the following corrective movements thereof: +9° on a north heading; +6° on an east heading; —9° on a south heading; and —6° on a west heading; or, the combination of the corrective movements above pointed out.

Hence, the compass may be corrected for deviation in its indication due to any known local magnetic disturbance on a craft in the foregoing manner and by means shown in the drawings.

I have illustrated in Fig. 1 one form of compass comprising a magnetic bar or needle 6 which is pivotally supported for rotation in azimuth in a housing or frame 7. In the form shown, the needle 6 is operatively connected with a transmitter 8, shown diagrammatically, and the housing is provided with compass card calibrations so that, merely for illustration purposes, the compass may be considered both as a direct reading and as a part of a remote reading instrument. In the embodiment shown, the housing 7 is pendulously supported in a gimbal ring 9 by means of trunnions 10 while the ring, in turn, is pivotally supported on trunnions 11 in a supporting frame member 12.

With this construction, the housing may tilt about the axis of trunnions 10 and the ring may tilt about the axis of trunnions 11, providing mutually perpendicular pivotal axes for the housing. In the embodiment shown, the output leads of the transmitter 8 are conducted through cable 13 to the repeater compass.

Assuming that the axis of trunnions 11 extends along the fore and aft axis of the craft and that the axis of trunnions 10 extends athwartship, it will be seen that the needle or sensitive element of the compass may be tilted in the manner hereinabove described.

To adjustably tilt the housing 9, I have shown for exemplary purposes masses or weights 14 and 15. The weight 14 is threaded on a screw-threaded shaft 16 which is mounted between the legs of a yoke 17, preferably disposed with its longitudinal axis on a diameter of the housing 7 and parallel to the axis of trunnions 11. The weight 15 is mounted in a similar manner in a yoke 18 which is supported on the gimbal ring 9 and extends to each side of the axis of trunnions 11. By rotating the weight 14, it may be adjusted in either direction longitudinally of shaft 16 to produce a tilt of substantially any desired or necessary magnitude of the casing 7 in either direction relative to the vertical and about the axis of trunnions 10. The weight 15 may be operated in like manner to produce tilting of the housing 7 and gimbal ring 9 to any predetermined degree about the axis of trunnions 11.

When the housing 7 is so tilted, the needle will be supported to pivot or rotate in a plane tilted out of horizontal in the direction and in an amount depending on the adjustment of the masses 14 and 15, and the tilt of said plane will be maintained. It should be noted that, as the craft carrying the compass changes its azimuthal heading, the tilted plane in which the needle may rotate, rotates with the craft in azimuth about a vertical axis. Similarly, in the case of the flux valve shown in Fig. 3, the normally horizontal plane of the longitudinal axis of the valve, being any axis lying in the common plane of the longitudinal axes of the core legs, may be positioned and maintained in predetermined inclined relation to the horizontal, said plane, when so inclined, rotating about a vertical axis with azimuthal movements of the craft.

The transmitter 8 may be connected with a repeater compass in the manner shown in Fig. 2 wherein needle 6 is connected to rotate with the inductor 19 of a transmitter indicated generally at 20. The transmitter comprises coils 21 and 22, the fields of which are disposed at right angles to each other and to an exciter winding 23 which is connected to a source of alternating current 24. One end of each of coils 21 and 22 is connected to the other and in turn connected to the grid of an electron discharge tube 25. The other ends of each of said coils are connected respectively to the grids of tubes 26 and 27. The plates of these tubes are energized by means of battery 28 and are connected to the coils 29 and 30 of the repeater unit 31 in substantially the same manner as the transmitter coils are connected to the grids of these tubes. The armature 32 of the repeater unit is operatively connected to a rotatable compass card 33 and the armature coil 34 thereof is also energized from the alternating current source 24.

With this arrangement, any change in direction of the inductor 19 of the transmitter relative to the fields of coils 21 and 22 will produce a change in the direction of the resultant field of coils 29 and 30 of the repeater unit and produce a corresponding angular change in the position of the armature 32 relative to said fields. Relative angular changes in position of needle 6 with respect to the resultant field of the transmitter will be reflected in the angular position of compass card 33 of the repeater unit relative to the reference pointer and therefore any correction for deflection of the needle will produce a corresponding correction in the otherwise erroneous reading of the repeater.

In Fig. 3 I have shown my invention applied to a flux valve type of compass. The flux valve comprises a three-legged core, 2 legs 35 and 36 of which appear in the drawings, having windings 37 and 38 mounted thereon. The three windings of the valve may be Y-connected and in turn connected to the delta-connected field of a repeater unit 39, as shown. The sensitive element or core and windings of the flux valve are pendulously supported in a manner similar to that shown in Fig. 1. In the embodiment shown, the core windings including the energizing coil 40, which is supplied from a source of alternating current 41, are mounted in a two-part casing. The lower part or base 42 of said casing is supported on trunnions 43 in a gimbal ring 44 which, in turn, is supported by trunnions 45 in supports 46. Weights 47 and 48 are adjustably mounted on the base 42 and the gimbal ring 44, respectively, preferably in a similar manner to that above described in connection with Fig. 1. The upper part 49 of the casing is rotatably mounted in the lower part 42 thereof and is provided with a bevel ring gear 50 adapted to mesh with a bevel pinion 51 rotatably mounted in an up-standing leg of the base portion 42. By means of a knob 52 the pinion may be rotated to shift the sensitive element of the flux valve and its casing angularly in azimuth for course-setting purposes.

The device of Fig. 3 may be adjustably tilted in the same manner as that of Fig. 1, and corrections for deviation produced by such tilting will appear in the readings at the repeater end of the compass.

In Fig. 7, I have illustrated one manner in which a compass or the sensitive element thereof may be slaved by or coupled to a gyro vertical whereby to maintain it in a predetermined, tilted or adjusted position. The gimbal ring 53 for the compass includes shaft or trunnion 54 which is supported in a suitable bearing and in alignment with the trunnions 55 of the gimbal ring 56 of a gyro vertical. These trunnions are connected together by coupling 57 which permits relative, rotational adjustment of the two trunnions whereby ring 53 may be tipped to any desired extent relative to ring 56 and the trunnions then connected together in fixed angular relationship. The housing 58 of the compass, which is pivotally supported in gimbal ring 53, is provided with an up-standing rod 59, preferably extending radially with respect to the axis of trunnions 54 and 55. Rod 59 is connected with a rod 60 on the rotor bearing case of the gyro through universal couplings 61 and 62 and rods 63 and 64 which are connected together by turn buckle 65. This construction permits the compass unit to be tilted about axes in quadrature and in its tilted position to be operatively connected to a gyro vertical which functions to maintain the sensitive element of the compass in its predeterminately tilted position.

The coupling shown for exemplary purposes in Fig. 7 comprises plates 66 and 67 having roughened surfaces adapted frictionally to engage each other for substantially any degree of relative rotation of trunnions 54 and 55. Preferably, plate 67 mounted on the trunnion of the gyro vertical is slidable thereon but fixed against angular movement relative thereto by the key 68 whereby to prevent the application of any axial force to the gyro trunnions. The perimeter of plate 66 is threaded to cooperate with the interiorly threaded coupler 69 which serves to maintain plates 66 and 67 in angularly adjusted relation.

It may additionally be noted that by correcting for compass deflection due to local magnetic disturbances in the foregoing manner, heeling error will be reduced, and simplified constructions may result.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A compass and error-correcting means therefor comprising a sensitive element affected by the earth's magnetic field and having a longitudinal axis normally positioned in a horizontal plane when arranged for azimuth indication purposes, supporting means for said sensitive element having an axis in fixed perpendicular relation to the longitudinal axis of said sensitive element, a universal mounting providing normally horizontal, mutually perpendicular axes about which said supporting means may be pivoted to arrange the said axis thereof substantially vertical and to position said sensitive element substantially horizontally, and means for positioning and maintaining said supporting means in a position with its said axis inclined with relation to the vertical to a predetermined degree and in such a direction that said sensitive element is subjected to an effective vertical component of the earth's field to correct for deviation of said sensitive element due to local attraction.

2. A compass and error-correcting means therefor comprising a sensitive element affected by the earth's magnetic field and having a longitudinal axis normally positioned in a horizontal plane when arranged for azimuth indication purposes, means for supporting said sensitive element to lie with its longitudinal axis in a plane fixed in relation to said supporting means and rotatable therewith in azimuth about a vertical axis, a universal mounting providing normally horizontal, mutually perpendicular axes about which said supporting means may be pivoted, and means for positioning said supporting means to place the said plane of said sensitive element in predetermined inclined relation and for maintaining it in such inclined relation to the horizontal wherein said element is subjected to an effective vertical component of the earth's field.

3. A compass and error-correcting means therefor comprising a sensitive element affected by the earth's magnetic field and having a longitudinal axis normally positioned in a horizontal plane when arranged for azimuth indication purposes, means for supporting said sensitive element to lie with its longitudinal axis in a plane fixed in relation to said supporting means and rotatable therewith in azimuth about a vertical axis, a universal mounting providing normally horizontal, mutually perpendicular axes about which said supporting means may be pivoted, and means for tilting and maintaining said supporting means and said plane in tilted relation to horizontal to a predetermined degree about one of the axes of the universal mounting and in a position wherein the sensitive element is subjected to an effective vertical component of the earth's field.

4. A compass and error-correcting means therefor comprising a sensitive element affected by the earth's magnetic field, supporting means for rotatably supporting said sensitive element to pivot in a plane fixed in relation thereto and rotatable therewith about a vertical axis, a universal mounting providing normally horizontal, mutually perpendicular axes about which said supporting means may be pivoted substantially vertically to position the axis of rotation of said sensitive element, and means for positioning and maintaining said axis of rotation of said sensitive element in non-vertical position and said plane in inclined relation to horizontal to a predetermined degree and in a predetermination direction whereby to correct for deviation of said sensitive element due to local attraction.

5. A compass and error-correcting means therefor comprising a flux valve, a universal mounting providing normally horizontal, mutually perpendicular axes about which said flux valve may be pivoted, and means for positioning and maintaining said flux valve in a plane tilted in a predetermined direction and to a predetermined degree with relation to the horizontal whereby it may be subjected to an effective vertical component of the earth's field.

6. A compass and error-correcting means therefor comprising a sensitive element affected by the earth's magnetic field and having a longitudinal axis normally positioned in a horizontal plane when arranged for azimuth indication purposes, supporting means therefor for supporting said sensitive element to lie with its longitudinal axis in a plane fixed in relation to said supporting means and rotatable therewith in azimuth about a vertical axis, said supporting means including a universal mounting having pivotal elements pendulously carrying said sensitive element and providing normally horizontal, mutually perpendicular axes about which said sensitive element may be pivoted, and adjustable means associated with each of said pivotal elements of said supporting means for eccentrically varying the mass thereof whereby to place and maintain the plane of said sensitive element in inclined relation to horizontal wherein it is subjected to a vertical component of the earth's field.

7. A compass and error-correcting means therefor comprising a sensitive element affected by the earth's magnetic field and having a longitudinal axis normally positioned in a horizontal plane when arranged for azimuth indication purposes, supporting means therefor for supporting said sensitive element to lie with its longitudinal axis in a plane fixed in relation to said supporting means and rotatable therewith in azimuth about a vertical axis, said supporting means including a universal mounting having pivotal elements pendulously carrying said sensitive element and providing normally horizontal, mutually perpendicular axes about which said sensitive element may be pivoted, a pair of movable masses, and means for adjustably supporting one of said masses on each of two pivotal elements, respectively, of said supporting means for movements in directions laterally and to each side of the pivotal axis of the element on which they are supported whereby the said plane of said sensitive element may be placed and maintained in inclined relation to horizontal wherein it is subjected to a vertical component of the earth's field.

8. A compass and error-correcting means therefor comprising a sensitive element affected by the earth's magnetic field and having a longitudinal axis normally positioned in a horizontal plane when arranged for azimuth indication purposes, pendulous supporting means therefor for supporting said sensitive element to lie with its longitudinal axis in a plane fixed in relation to said supporting means and rotatable therewith in azimuth about a vertical axis, said supporting means including a frame for supporting said sensitive element and a gimbal ring pivotally mounted in a relatively fixed support, said frame being pivotally mounted on said gimbal ring with its axis substantially perpendicular to the pivotal axis of said gimbal ring whereby to form a universal mounting for said field-sensitive element, a first movable mass, means for adjustably supporting said mass on said supporting means for movement in a direction laterally and to each side of the pivotal axis of said frame, a second movable mass and means for adjustably supporting said second mass on said supporting means for movement in a direction laterally of and to each side of the pivotal axis of said gimbal ring.

9. A compass and error-correcting means therefor comprising a sensitive element affected by the earth's magnetic field and having a longitudinal axis normally positioned in a horizontal plane when arranged for azimuth indication purposes, means for supporting said sensitive element to lie with its longitudinal axis in a plane fixed in relation to said supporting means and rotatable therewith in azimuth about a vertical axis, a universal mounting providing normally horizontal, mutually perpendicular axes about which said supporting means may be pivoted substantially horizontally to position said sensitive element in a position subjecting it substantially only to the horizontal component of the earth's field, and a gyro vertical operatively connected with said supporting means for maintaining said plane of said sensitive element out of said horizontal position to a predetermined degree wherein it is subjected to an effective vertical component of the earth's field to correct for deviation of said sensitive element due to local attraction.

10. A compass and error-correcting means therefor comprising a sensitive element affected by the earth's magnetic field and having a longitudinal axis normally positioned in a horizontal plane when arranged for azimuth indication purposes, means for supporting said sensitive element to lie with its longitudinal axis in a plane fixed in relation to said supporting means and rotatable therewith in azimuth about a vertical axis, a universal mounting providing normally horizontal, mutually perpendicular axes about which said supporting means may be pivoted substantially horizontally to position said sensitive element in a position subjecting it substantially only to the horizontal component of the earth's field, a gyro vertical for maintaining said plane of said sensitive element tilted in a predetermined direction and to a predetermined degree with relation to the horizontal wherein it is subjected to an effective vertical component of the earth's field, and adjustable connecting means for operatively connecting said gyro to said supporting means.

11. A compass and error-correcting means therefor comprising a sensitive element affected by the earth's magnetic field and having a longitudinal axis normally positioned in a horizontal plane when arranged for azimuth indication purposes, means for supporting said sensitive element to lie with its longitudinal axis in a plane fixed in relation to said supporting means, a universal mounting providing normally horizontal, mutually perpendicular axes about which said supporting means may be pivoted, and gyroscopic means for positioning and maintaining said plane of said sensitive element in inclined relation to horizontal in a predetermined direction and to a predetermined degree to subject said element to an effective vertical component of the earth's field, said plane of said sensitive element being rotatable in azimuth with said supporting means about the vertical.

12. A compass and error-correcting means therefor comprising a sensitive element affected by the earth's magnetic field and having a longitudinal axis normally positioned in a horizontal plane when arranged for azimuth indication purposes, means for pendulously supporting said sensitive element to lie with its longitudinal axis in a horizontal plane, means for positioning and maintaining said plane in inclined relation to horizontal in a predetermined direction and to a predetermined degree to subject said element to an effective vertical component of the earth's field and thereby correct for deviation of said sensitive element due to local attraction, said plane of said sensitive element being rotatable in azimuth with said pendulous supporting means about the vertical.

FREDERICK D. BRADDON.